US009255692B2

United States Patent
Masuda

(10) Patent No.: US 9,255,692 B2
(45) Date of Patent: Feb. 9, 2016

(54) LIGHT SOURCE UNIT CAPABLE OF SHINING LIGHT OF HIGH IN-PLANE UNIFORMITY, ILLUMINATING METHOD OF LIGHT SOURCE UNIT, AND PROJECTOR

(71) Applicant: CASIO COMPUTER CO., LTD., Shibuya-ku, Tokyo (JP)

(72) Inventor: Hiroki Masuda, Akishima (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 181 days.

(21) Appl. No.: 14/031,643

(22) Filed: Sep. 19, 2013

(65) Prior Publication Data

US 2014/0078476 A1 Mar. 20, 2014

(30) Foreign Application Priority Data

Sep. 20, 2012 (JP) .................................. 2012-206668

(51) Int. Cl.
| | |
|---|---|
| G03B 21/00 | (2006.01) |
| F21V 9/08 | (2006.01) |
| G03B 21/14 | (2006.01) |
| G03B 21/20 | (2006.01) |
| G03B 33/12 | (2006.01) |
| H04N 9/31 | (2006.01) |

(52) U.S. Cl.
CPC ................ *F21V 9/08* (2013.01); *G03B 21/142* (2013.01); *G03B 21/204* (2013.01); *G03B 21/208* (2013.01); *G03B 21/2013* (2013.01); *G03B 33/12* (2013.01); *H04N 9/3111* (2013.01); *H04N 9/3158* (2013.01); *H04N 9/3161* (2013.01); *G03B 21/2066* (2013.01)

(58) Field of Classification Search
CPC ............... G03B 21/204; G03B 21/208; G03B 21/2013; G03B 21/2066; H04N 9/3161
USPC .............. 353/31, 37, 38, 84, 85, 94, 99, 102; 362/84, 293, 300, 301; 359/207.9, 359/485.01, 487.01
See application file for complete search history.

(56) References Cited

U.S. PATENT DOCUMENTS

| | | | |
|---|---|---|---|
| 8,403,492 B2 | 3/2013 | Shibasaki | |
| 8,840,253 B2* | 9/2014 | Kitano | ............................ 353/84 |
| 8,894,241 B2 | 11/2014 | Kitano | |
| 2009/0034284 A1 | 2/2009 | Li et al. | |
| 2011/0234923 A1* | 9/2011 | Yamagishi et al. | ............ 348/757 |
| 2011/0310362 A1* | 12/2011 | Komatsu | ........................ 353/85 |
| 2012/0133903 A1* | 5/2012 | Tanaka | ............................. 353/31 |
| 2013/0107223 A1* | 5/2013 | Toyooka | ................ G03B 21/16 353/31 |
| 2015/0172610 A1* | 6/2015 | Candry | ................ G03B 21/142 353/85 |

FOREIGN PATENT DOCUMENTS

JP 2011-053323 A 3/2011

OTHER PUBLICATIONS

Related U.S. Appl. No. 14/030,982 ; First Named Inventor: Hiroki Masuda; Title: "Light Source Unit Capable of Preventing Deterioration of Luminescent Material Layer, Illuminating Method of Light Source Unit, and Projector"; filed Sep. 18, 2013.

* cited by examiner

*Primary Examiner* — Sultan Chowdhury
(74) *Attorney, Agent, or Firm* — Holtz, Holtz & Volek PC

(57) ABSTRACT

There is provided a light source unit including an excitation light source which emits excitation light, a luminescent material which receives excitation light from the excitation light source to emit luminous light, a diffuse plate on which the luminous light is incident, and a driving device which moves the diffuse plate so as to change an entering position of the luminous light on the diffuse plate.

5 Claims, 5 Drawing Sheets

LIGHT SOURCE UNIT CAPABLE OF SHINING LIGHT OF HIGH IN-PLANE UNIFORMITY, ILLUMINATING METHOD OF LIGHT SOURCE UNIT, AND PROJECTOR

CROSS-REFERENCE TO RELATED APPLICATION

This application is based upon and claims the benefit of priority under 35 USC 119 of Japanese Patent Application No. 2012-206668 filed on Sep. 20, 2012, the entire contents of which are incorporated herein by reference.

BACKGROUND OF THE INVENTION

1. Field of the Invention

The present invention relates to a light source unit capable of shining light of high in-plane uniformity, an illuminating method of this light source unit, and a projector including the light source unit.

2. Description of the Related Art

In these days, data projectors are used on many occasions as an image projection unit which projects images including an image of a screen and a video image of a personal computer, as well as images based on image data which is stored on a memory card on to a screen. In these data projectors, light emitted from a light source converges at a micromirror display element called a DMD (Digital Micromirror Device) or a liquid crystal panel so that a color image is displayed on a screen.

Conventionally, the mainstream of these projectors has been those which utilize a high-intensity discharge lamp as a light source. In recent years, however, there have been made various developments on projectors which use, as a light source, a light emitting diode, a laser diode, an organic EL device, a luminescent material or the like.

Additionally, in recent years, there have also been made various proposals of light source units having a light emitting diode as an excitation light source and a luminescent wheel in which a luminescent material layer which converts ultraviolet light emitted from the excitation light source as excitation light into visible light is formed on a transparent base.

In the present situations in which the production of a light emitting diode is difficult which can emit highly bright light of a range of green wavelengths as a light source for the projectors described above, Japanese Unexamined Patent Publication No. 2011-53323 discloses a projector which utilizes a light source unit which emits highly bright light of a range of green wavelengths by using a green light emitting luminescent material and a small and high-output laser diode as an excitation light source. As a result, the projector can project a clear image on a screen even in a bright room.

SUMMARY OF THE INVENTION

In the light source unit described above, however, in which the laser emitting device is used as the excitation light source to shine excitation light on to the luminescent material so as to emit luminous light for use as light source light, in case there is unevenness of in-plane uniformity in excitation light, unevenness of luminance is produced from time to time in luminous light emitted by the luminescent material in terms of in-plane uniformity of a pencil of light.

The invention has been made with a view to eliminating the problem inherent in the related art, and an object thereof is to provide a high-intensity light source unit which emits a pencil of light of higher in-plane uniformity to thereby provide a projector which enables the projection of an image which has little unevenness of luminance.

According to a first preferred aspect of the invention, there is provided a light source unit including an excitation light source which emits excitation light, a luminescent material which receives excitation light from the excitation light source to emit luminous light, a diffuse plate on which the luminous light is incident, and a driving device which moves the diffuse plate so as to change an entering position of the luminous light on the diffuse plate.

According to a second preferred aspect of the invention, there is provide a projector including a light source unit, a light-source-side optical system which guides light from the light source unit to a display element, a display element which forms an optical image by using light shone on thereto, a projection-side optical system which projects the optical image formed by the display element on to a screen, and a projector control unit which has a light source control module for the light source unit and a display element control module, wherein the light source unit is the light source according to the first preferred aspect.

According to a third preferred aspect of the invention, there is provided a light source unit illumination method including shining excitation light from an excitation light source on to a luminescent material, causing luminous light emitted from the luminescent material to enter a diffuse plate, diffusing the luminous light on the diffuse plate while changing an entering position of the luminous light which enters the diffuse plate by moving the diffuse light, and thereafter collecting the luminous light diffused on the diffuse plate for emission from a light source unit.

BRIEF DESCRIPTION OF THE SEVERAL VIEWS OF THE DRAWINGS

The above and further objects, characteristics and advantages of the invention will be more obvious from the following detailed description along with accompanying drawings. Here.

DETAILED DESCRIPTION OF THE PREFERRED EMBODIMENT

Figure 1:
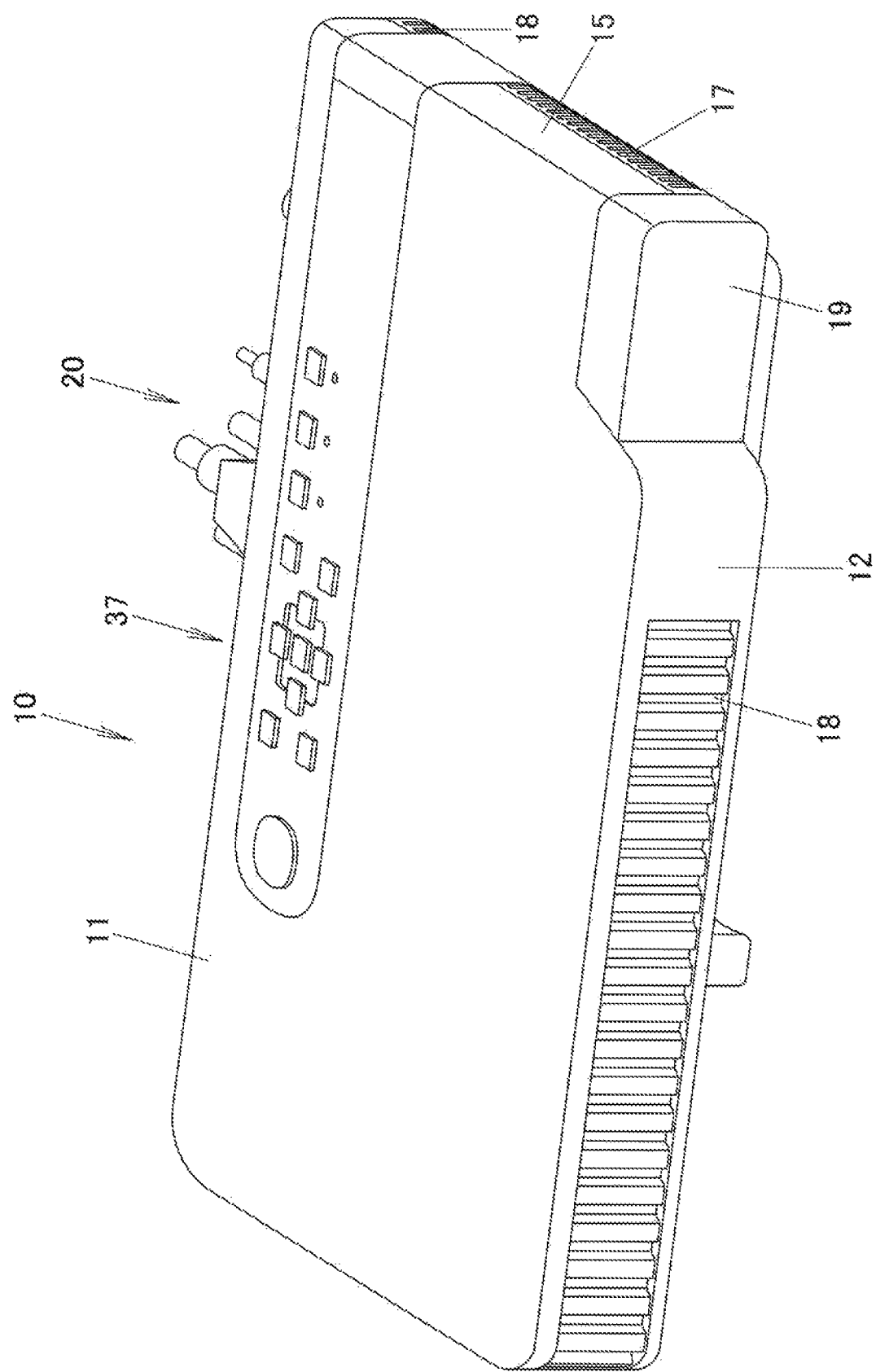
FIG. 1 is an external perspective view showing one example of a projector according to an embodiment of the invention.

Hereinafter, a best mode for carrying out the invention will be described by the use of the accompanying drawings. However, although various limitations which are technically preferable to carry out the invention are given to an embodiment which will be described below, the scope of the invention should not be limited at all to the embodiment and drawings which will be described and illustrated below.

According to one embodiment of the invention, a projector 10 includes a light source unit 60 as a light source unit, a display element 51, a light-source-side optical system 170 which guides light from the light source unit 60 to the display element 51, a projection-side optical system 220 which projects an image emitted from the display element 51 on to a screen, and a projector control unit which controls the light source unit 60 and the display element 51.

The light source unit 60 includes a green light source device made up of an excitation light shining device 70 and a luminous light emitting device 100, a red light source device 120, a blue light source device 130, and a light guiding optical system 140.

The excitation light shining device 70 in the green light source device includes excitation light sources 71 which shine excitation light of a range of blue wavelengths on to a luminescent wheel 101 as a rotational member. In addition, the luminescent wheel 101 of the luminous light emitting device 100 in the green light source device is a circular disk-shaped metallic base. Then, the luminescent wheel 101 has a luminous light emitting area of a semi-annular shape on which a luminescent material layer 102 made of a green luminescent material is formed and a diffuse transmission portion 104 which transmits light in a diffusing fashion on the circular disk-shaped metallic base.

Further, this luminous light emitting device 100 has a light guiding optical system made up of mirrors 108, 109 and collective lenses 105, 106, 107 which shine excitation light which passes through the diffuse transmission portion 104 of the luminescent wheel 101 towards the luminescent material layer 102 of the luminescent wheel 101 and which enable luminous light from the luminescent material layer 102 to pass through the diffuse transmission portion 104. The excitation light shining device 70 is illuminated while rotating the luminescent wheel 101.

Consequently, when light of the range of blue wavelengths from the excitation light shining device 70 passes through the diffuse transmission portion 104 of the luminescent wheel 101 to be shone on to the luminous light emitting area, light of the range of green wavelengths is emitted from the luminescent material layer 102 of the green luminescent material which absorbs the blue light as excitation light. This luminous light of the range of green wavelengths is caused to be incident on the diffuse transmission portion 104 of the luminescent wheel 101 by the light guiding optical system, passes through the diffuse transmission portion 104 and is finally emitted from the luminous light emitting device 100. Namely, luminous light from the luminescent material layer 102 is allowed to pass through the diffuse transmission portion 104 by the rotation of the luminescent wheel 101, and therefore, it is possible to emit light having high in-plane uniformity from the luminous light emitting device 100.

Further, the red light source device 120 has, as a red light source 121, a red light emitting diode which is a semiconductor light emitting element which emits light of a range of red wavelengths. The blue light source device 130 has, as a blue light source 131, a blue light emitting diode which is a semiconductor light emitting element which emits light of a range of blue wavelengths. The light guiding optical system 140 is configured so as to change the axes of green light, red light and blue light which are emitted from the luminescent wheel 101, the red light source device 120 and the blue light source device 130, respectively so that pencils of light of the respective colors are collected to an entrance of a light tunnel 175 and hence has pluralities of dichroic mirrors, collective lenses and the like. Then, in the light source unit 60, a light source controller of the projector control unit controls individually the emission of light from the excitation light shining device 70, the red light source device 120 and the blue light source device 130, whereby combined light or monochromatic light can be emitted from the light source unit 60.

Hereinafter, the embodiment of the invention will be described in detail based on the drawings. FIG. 1 is an external perspective view of the projector 10. In this embodiment, when left and right are referred to with respect to the projector 10, they denote, respectively, left and right with respect to a projecting direction, and when front and rear are referred to with respect to the projector 10, they denote, respectively, front and rear with respect to a direction towards a screen and the traveling direction of a pencil of light emitted from the projector 10 towards the screen.

As is shown in FIG. 1, the projector 10 has a substantially rectangular parallelepiped shape. The projector 10 has a lens cover 19 for covering a projection port which is laid to a side of a front panel 12 which is referred to as a front side panel of a projector casing. Additionally, a plurality of outside air inlet slits 18 are provided in the front panel 12. Further, although not shown, the projector 10 includes an Ir reception unit which receives a control signal from a remote controller.

In addition, a keys/indicators unit 37 is provided on an upper panel 11 of the projector casing. Disposed on this keys/indicators unit 37 are keys and indicators which include a power supply switch key, a power indicator which informs whether the power supply is on or off, a projection switch key which switches on or off the projection by the projector, and an overheat indicator which informs of an overheat condition when the light source unit, the display element, a control circuit or the like overheats.

Further, provided in a back side or a back panel of the projector casing are an input/output connector unit where USB terminals, an image signal input D-SUB terminal, an S terminal, an RCA terminal and the like are provided and various types of terminals 20 including a power supply adaptor plug and the like. Additionally, a plurality of outside air inlet slits 18 are formed in the back panel. A plurality of inside air outlet slits 17 are formed in each of a right panel, not shown, which is a side panel of the projector casing and a left panel 15 which is a side panel shown in FIG. 1. In addition, outside air inlet slits 18 are also formed in a portion of the left panel 15 which lies in a corner portion formed between the back panel and the left panel 15. Further, pluralities of outside air inlet slits or inside air outlet slits are formed in a lower panel, not shown, in portions lying near the front, back, left and right panels.

Figure 2:
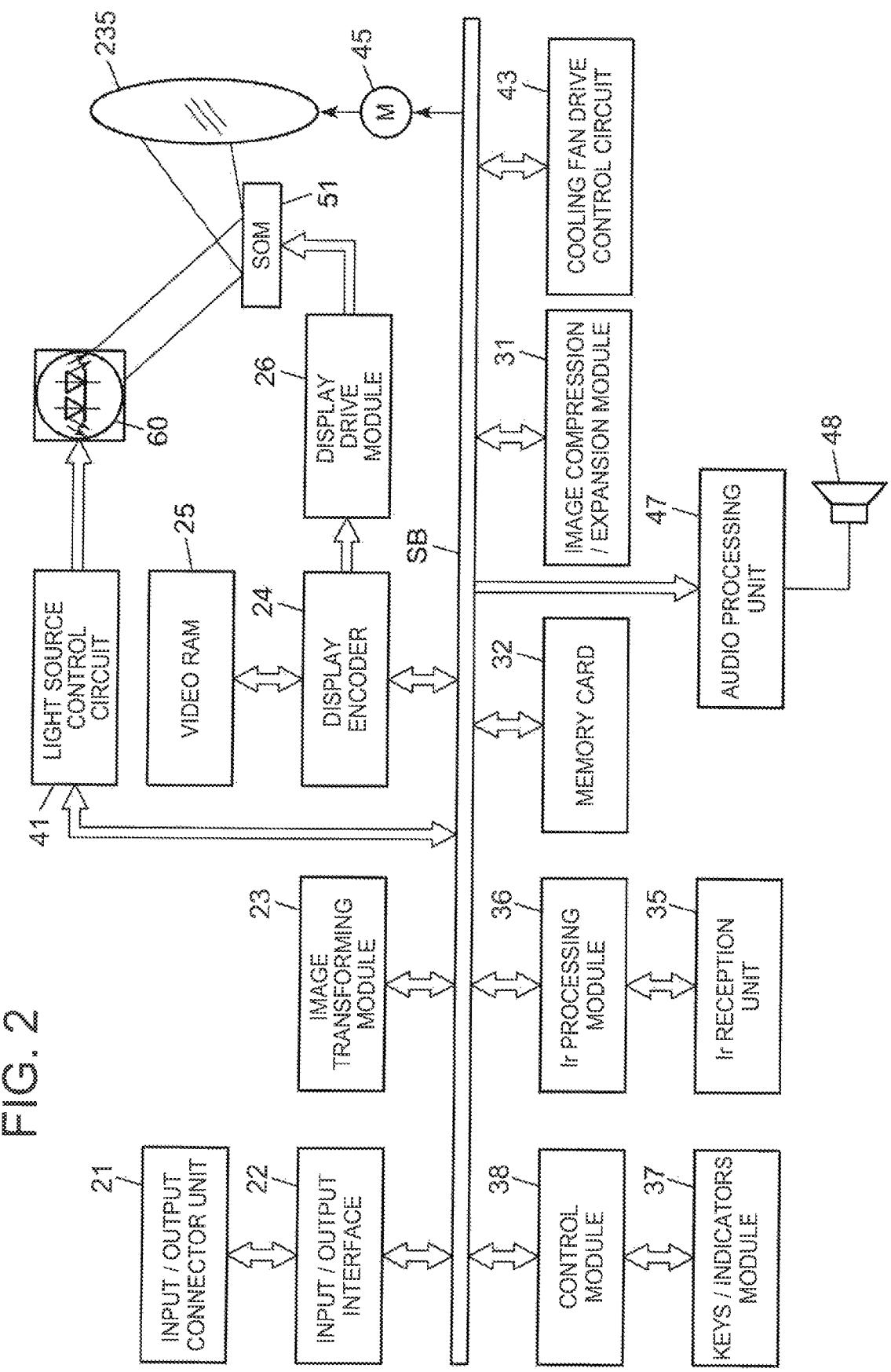
FIG. 2 is a block diagram showing a functional circuit block of the projector according to the embodiment of the invention.

Next, the projector control unit of the projector 10 will be described by the use of a functional block diagram shown in FIG. 2. The projector control unit includes a control module 38, an input/output interface 22, an image transforming module 23, a display encoder 24, a display drive module 26 and the like, whereby image signals of various standards that are inputted from the input/output connector unit 21 are sent via the input/output interface 22 and a system bus (SB) to the image transforming module 23 where the image signals are transformed so as to be unified into an image signal of a predetermined format which is suitable for display by the projector control unit. Thereafter, the image signals so transformed are outputted to the display encoder 24.

The display encoder 24 deploys the image signals that have been inputted thereinto on a video RAM 25 for storage therein and generates a video signal from the contents stored in the video RAM 25, outputting the video signal so generated to the display drive module 26.

The display drive module 26 functions as a display element control module and drives the display element 51, which is a spatial optical modulator (SOM), at an appropriate frame rate in response to the image signal outputted from the display encoder 24.

In this projector 10, a pencil of light which is emitted from the light source unit 60, which is a light source device, is shone onto the display element 51 via the light-source-side optical system 170, which will be described later, to thereby form an optical image based on reflected light which is reflected by the display element 51. The image so formed is then projected on to a screen, not shown, for display thereon via the projection-side optical system 220, which will be described later. In addition, a movable lens group 235 of the projection-side optical system 220 is driven by a lens motor 45 for zooming or focusing.

An image compression/expansion module 31 performs a recording operation in which a luminance signal and a color difference signal of an image signal are data compressed through ADCT and Huffman coding processes and the compressed data is sequentially written on a memory card 32 which is configured as a detachable recording medium. Further, when in a reproducing mode, the image compression/expansion module 31 reads out image data recorded on the memory card 32 and expands individual image data which make up a series of dynamic images frame by frame. Then, the image data is outputted to the display encoder 24 via the image transforming module 23 so as to enable the display of dynamic images and the like based on the image data stored on the memory card 32.

The control module 38 governs the control of respective operations of circuitries within the projector 10 and is made up of a CPU, a ROM which stores in a fixed fashion operation programs of various types of settings and a RAM which is used as a working memory.

Operation signals generated at the keys/indicators unite 37 which is made up of the main keys and indicators provided on the upper panel 11 of the projector casing are sent out directly to the control module 38. Key operation signals from the remote controller are received by the Ir reception unit 35, and a code signal demodulated at an Ir processing module 36 is outputted to the control module 38.

In addition, an audio processing unit 47 is connected to the control module 38 via the system bus (SB). This audio processing module 47 includes a circuitry for a sound source such as a PCM sound source. When in a projection mode and a reproducing mode, the audio processing unit 47 converts audio data into analog signals and drives a speaker 48 to output loudly sound or voice based on the audio data.

The control module 38 controls a light source control circuit 41 which is configured as a light source control unit. This light source control circuit 41 controls individually the emission of light from the excitation light shining device 70, the red light source device 120 and the blue light source device 130 of the light source unit 60 so that light of predetermined ranges of wavelengths which is required when an image is generated is emitted from the light source unit 60.

Further, the control module 38 causes a cooling fan drive control circuit 43 to detect temperatures through a plurality of temperature sensors which are provided in the light source unit 60 and the like so as to control the rotating speed of cooling fans based on the results of the temperature detection. Additionally, the control module 38 also causes the cooling fan drive control circuit 43 to keep the cooling fan rotating even after the power supply to a projector main body is switched off by use of a timer or the like. Alternatively, the control module 38 causes the light source control circuit 41 to cut off the power supply to the projector main body depending upon the results of the temperature detections by the temperature sensors.

Figure 3:
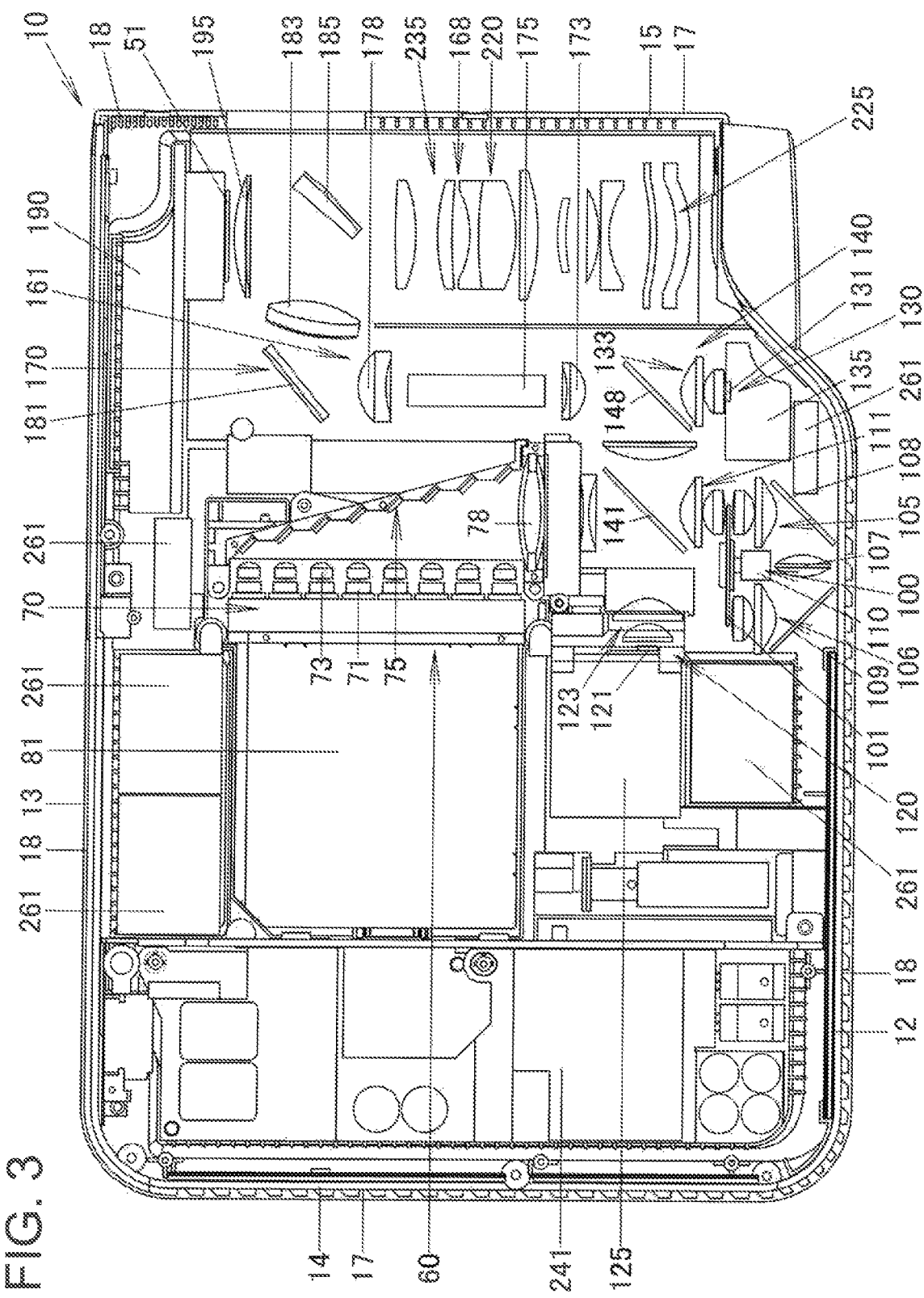
FIG. 3 is an exemplary plan view showing one example of an internal construction of the projector according to the embodiment of the invention.

Next, an internal construction of the projector 10 will be described. FIG. 3 is an exemplary plan view showing an internal construction of the projector 10. As shown in FIG. 3, the projector 10 includes a control circuit board 241 in proximity to the right panel 14. This control circuit board 241 includes a power supply circuit block, a light source control block and the like. Additionally, the projector 10 includes, as the light source device, the light source unit 60 configured as shown in FIG. 4 which lies to a side of the control circuit board 241, that is, in the substantially central portion of the projector casing.

Further, the projector 10 includes the light-source-side optical system 170 and the projection-side optical system 220 between the light source unit 60 and the left panel 15. In addition, the projection-side optical system 220 is disposed along the left panel 15, and the display element 51 which is a DMD (Digital Micromirror Device) is provided at the rear of the projection-side optical system 220 and near the back panel 13, whereby light emitted from the light source 60 is guided to the display element 51 by the light-source-side optical system 170.

Figure 4:
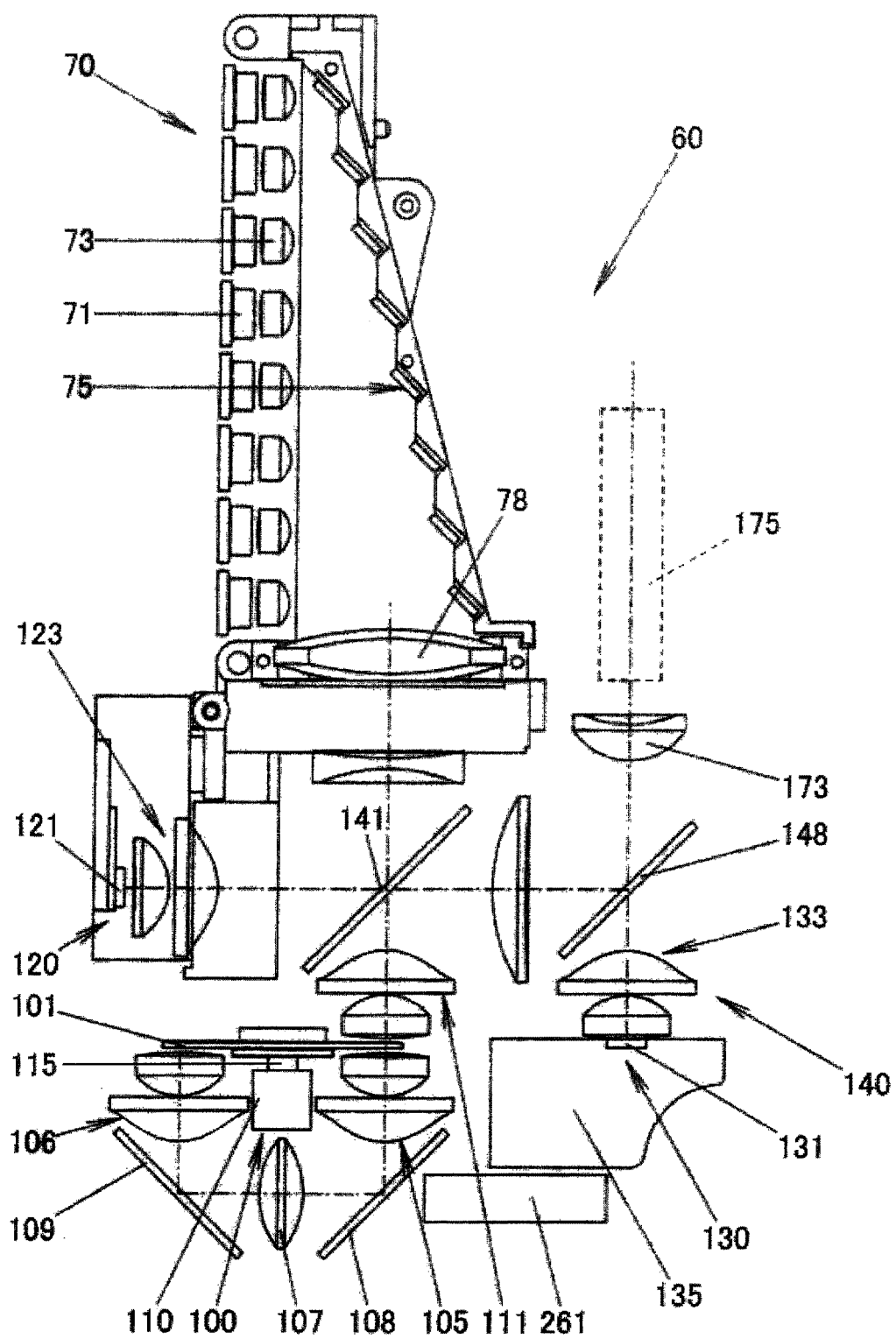
FIG. 4 shows one example of the construction of a light source unit according to the embodiment of the invention.

As shown in FIGS. 3 and 4, the light source unit 60 is disposed in a substantially central portion with respect to a left-to-right direction of the projector casing and has the excitation light shining device 70 and the luminous light emitting device 100 which make up the green light source device. The excitation light shining device 70 is disposed near the back panel 13, and the luminous light emitting device 100 is disposed near the front panel 12. Further, the light source unit 60 includes the blue light source device 130, the red light source device 120 and the light guiding optical system 140.

As will be described in detail later, the blue light source device 130 is disposed near the front panel 12 and emits light so that the light emitted becomes parallel to a pencil of light emitted from the luminous light emitting device 100. As will be described in detail later, too, the red light source device 120 is disposed between the excitation light shining device 70 and the luminous light emitting device 100 and emits light so that the light emitted intersects the pencil of light emitted from the luminous light emitting device 100 at right angles. Also, as will be described in detail later, the light guiding optical system 140 changes the directions of axes of light emitted from the luminous light emitting device 100, light emitted from the red light source device 120 and light emitted from the blue light source device 130 so that the axes of green light, red light and blue light are formed into the same axis so as to be collected at the entrance of the light tunnel 175.

The excitation light shining device 70 of the green light source device includes the excitation light sources 71 which are disposed so that optical axes thereof become parallel to the back panel 13, a group of reflecting mirrors 75 which changes the axis of light emitted from the excitation light sources 71 by 90 degrees in the direction of the front panel 12, a collective lens 78 which collects the light emitted from the excitation light sources 71 and reflected by the group of reflecting mirrors 75, and a heat sink 81 which is disposed between the excitation light sources 71 and the right panel 14.

The excitation light sources 71 are blue laser diodes which are arranged into a matrix. Collimator lenses 73 which convert light emitted from the blue laser diodes into parallel light are disposed individually on optical axes of the blue laser diodes. In addition, in the group of reflecting mirrors 75, a plurality of reflecting mirrors 75 are arranged into a step-like configuration so as to direct pencils of light emitted from the excitation light sources 71 towards the collective lens 78 while narrowing sectional areas thereof in one direction.

A cooling fan 261 is disposed between the heat sink 81 and the back panel 13, so that the excitation light sources 71 are cooled by the cooling fan 261 and the heat sink 81. Further, a cooling fan 261 is also disposed between the group of reflecting mirrors 75 and the back panel 13, so that the group of reflecting mirrors 75 and the collective lens 78 are cooled by the cooling fan 261.

The luminous light emitting device 100 includes the luminescent wheel 101, which is the rotational member, a rotational motor 110, and the light guiding optical system. The luminescent wheel 101 is disposed so as to be parallel to the front panel 12. In other words, the luminescent wheel 101 has a rotational shaft 115 which is parallel to an axis of excitation light and is disposed so as to intersect the axis of light emitted from the excitation light shining device 70 at right angles. The rotational motor 110 is a wheel motor which functions as a driving device for driving rotationally the luminescent wheel 101. The light guiding optical system functions to shine light which passes through the luminescent wheel 101 to emanate from the luminescent wheel 101 on to the other portion of the luminescent wheel 101 and has the first mirror 108 and the second mirror 109, the first collective lens 105, the second collective lens 106 and the intermediate collective lens 107. In addition, although it will be described in detail later, the luminescent wheel 101 has the diffuse transmission portion 104 and the luminescent material layer 102 which is provided side by side the diffuse transmission portion 104 and is placed on a side of the luminescent wheel 101 which faces the front panel 12.

The first mirror 108 of the light guiding optical system is disposed on the axis of light emitted from the excitation light shining device 70 and closer to the front panel 12 than the luminescent wheel 101. This mirror 108 reflects excitation light which passes through the diffuse transmission portion 104 of the luminescent wheel 101 so as to convert the light into light having an axis which is substantially parallel to the front panel 12. The first collective lens 105 collects excitation light which passes through the luminescent wheel 101 to shine the collected excitation light on to the first mirror 108. The intermediate collective lens 107 collects excitation light reflected by the first mirror 108 to shine the collected excitation light on to the second mirror 109. Then, the excitation light is reflected by the second mirror 109, and the second collective lens 106 collects the reflected excitation light to shine the collected excitation light on to the luminescent material layer 102 on the luminescent wheel 101.

In addition, luminous light emitted from the luminescent material layer 102 is guided by the light guiding optical system in such a way that luminous light emitted from one side of the luminescent wheel 101 enters the other portion of the luminescent wheel 101. Specifically, luminous light emanating from the material layer 102 is collected by the second collective lens 106 and is then reflected by the second mirror 109. Then, the luminous light so reflected is collected by the intermediate collective lens 107 and is reflected by the first mirror 108 to be incident on the diffuse transmission portion 104. It is noted that there may be a situation in which the intermediate collective lens 107 is omitted from the light guiding optical system depending upon a combination of lenses.

The luminous light emitting device 100 includes further a group of collective lenses 111. Luminous light emitted from the luminescent material layer 102 of the luminescent wheel 101 in the way described above by the light guiding optical system passes through the diffuse transmission portion 104 of the luminescent wheel 101 while being diffused. Thereafter, the luminous light emanates from the luminescent wheel 101 in the direction of the back panel 13 in the form of a pencil of light, and this pencil of light is collected by the group of collective lenses 111.

Figure 5:
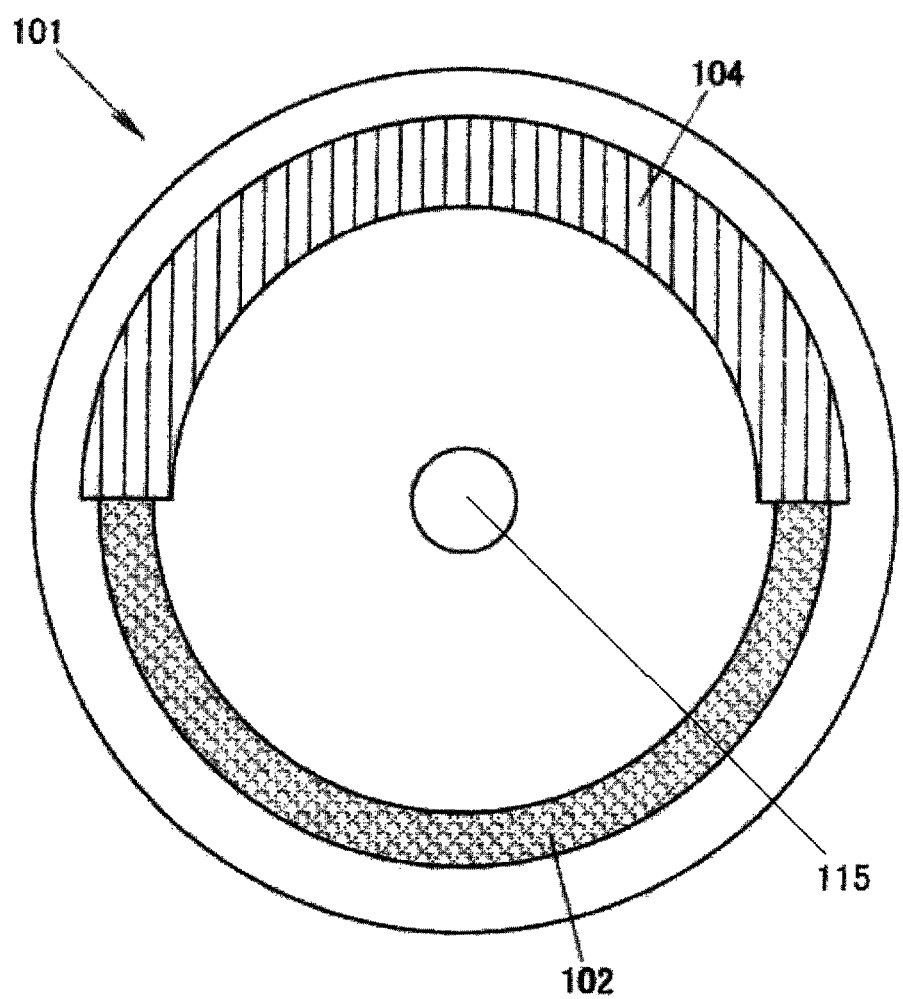
FIG. 5 shows a front view showing an example of a luminescent wheel according to the embodiment of the invention.

As shown in FIG. 5, this luminescent wheel 101 is formed of the circular disk-shaped metallic base. Formed as a recess portion is a semi-annular luminous light emitting area which emits luminous light of a range of green wavelengths by using light emitted from the excitation light sources as excitation light, and a green luminescent material is applied to this recess portion so that the luminescent material layer 102 is formed. On sides of the luminescent wheel, the luminescent material layer 102 is formed on the side of the luminescent wheel 101 which faces the front panel 12 of the projector 10 when the luminescent wheel 101 is set in the projector 10. Then, the diffuse transmission portion 104, which has a semi-annular shape and which is adapted to transmit light while diffusing it, is provided side by side the luminescent material layer 102, which is made into the luminous light emitting area, in an end-to-end fashion and in a circumferential direction. The portion of the base of the luminescent wheel 101 where the diffuse transmission area is formed is made up of a transparent base having light transmitting properties. Minute irregularities are formed at random on a front surface of the base through sandblasting or the like, whereby the portion of the luminescent wheel 101 is formed into a diffuse plate.

This diffuse transmission portion 104 is fixed to the luminescent wheel 101 such that the diffuse plate which transmits light while diffusing it is formed into a semi-circular shape and is then incorporated in the luminescent wheel 101. The front surface of the luminescent wheel 101 which faces the front panel 12 and where the luminous light emitting area is formed is mirror finished through silver deposition or the like so that a reflecting surface which reflects light is formed thereon. Then, the luminescent material layer 102 of the green luminescent material is laid on this reflecting surface.

Then, light emitted from the excitation light shining device 70 and shone on to the green luminescent material layer 102 excites the green luminescent material in the green luminescent material layer 102 via the diffuse transmission portion 104 and the light guiding optical system. Some of pencils of light luminously emitted in every direction from the green luminescent material are emitted directly towards the front panel 12 and others are emitted indirectly towards the front panel 12 after being reflected on the reflecting surface of the luminescent wheel 101. In addition, excitation light which is shone on to the metallic base without being absorbed by the luminescent material in the luminescent material layer 102 is reflected by the reflecting surface and enters the luminescent material layer 102 again to thereby excite the luminescent material layer 102. Thus, the utilization efficiency of excitation light emitted from the excitation light sources 71 can be enhanced by forming the surface of the recess portion in the luminescent wheel 101 into the reflecting surface, thereby making it possible to emit brighter luminous light.

Further, light emitted from the luminescent material layer 102 is collected by the second collective lens 106 of the light guiding system and is reflected by the second mirror 109. The reflected light then passes through the intermediate collective lens 107 and is thereafter reflected by the first mirror 108 to thereby be shone on to the diffuse transmission portion 104 of the luminescent wheel 101. In being shone on to the diffuse transmission portion 104, the reflected light is collected by the first collective lens 105 and passes through the diffuse transmission portion 104. Then, diffused light that has passed through the diffuse transmission portion 104 is then collected by the group of collective lenses 111.

In this way, light emitted from the luminescent material layer 102 is collected and diffused, and is there collected further for emission from the luminous light emitting device 100. Therefore, a pencil of light emitted from the luminous light emitting device 100 which functions as the green light source becomes luminous light whose in-plan uniformity is enhanced.

Incidentally, in the event that excitation light whose illuminance or intensity distribution is uneven enters the luminescent material layer 102 so as to emit luminous light, the intensity of luminous light emitted also becomes uneven, as a result of which unevenness of luminance and hence a slight partial color deviation in an image is caused in a projected image.

In order to make the intensity distribution of luminous light uniform, although the luminous light should be caused to pass through the diffuse plate once so as to diffuse the luminous light, even though luminous light is caused to pass through a diffuse plate which is fixed so as not to move, the intensity distribution of the luminous light which passes through the fixed diffuse plate still remains uneven.

In the invention, luminous light emitted from the luminescent material layer 102 passes through the diffuse transmission portion 104 of the luminescent wheel 101 which is rotating, and the diffuse plate is allowed to move so that the position where the luminous light passes through the diffuse transmission portion 104 changes as time elapses, that is, the entering position of the luminous light on the light entering surface of the diffuse plate changes. The irregularities are formed at random on the diffuse transmission portion 104, and therefore, the way in which the luminous light is diffused on the diffuse plate changes slightly depending upon the position where the luminous light enters. Consequently, by causing luminous light to pass through the diffuse transmission portion 104 of the luminescent wheel 101 which is rotating, the luminous light can be obtained as a combination of light which is diffused variously, as a result of which the intensity distribution of the luminous light can be made uniform.

In addition, excitation light which is to enter the luminescent material layer 102 is also allowed to enter the luminescent material layer 102 via the collective lenses of the light guiding optical system after it has passed through the diffuse transmission portion 104. Therefore, the in-plane uniformity of excitation light itself which enter the luminescent material layer 102 is enhanced and the in-plane uniformity of luminous light itself which is emitted from the luminescent material of the luminescent material layer 102 is also enhanced.

In addition, excitation light enters the diffuse transmission portion 104 of the luminescent wheel 101 which is rotating, and therefore, the spot of the excitation light which enters the diffuse transmission portion 104 moves minutely in an irregular fashion, as a result of which the diameter of a spot of light which enters the luminescent material layer can be made larger than that of light which enters an unmovable diffuse plate so as to be shone, thereby making it possible to enhance the utilization efficiency of the luminescent material.

The red light source device 120 includes the red light source 121 which is disposed so that an optical axis thereof becomes parallel to those of the excitation light sources 71 and a group of collective lenses 123 which collects light emitted from the red light source 121. The red light source device 120 is disposed so that an optical axis thereof intersects the axis of light emitted from the excitation light shining device 70 and the axis of light of the range of green wavelength emitted from the luminescent wheel 101. In addition, the red light source 121 is the red light emitting diode as a semiconductor light emitting element which emits light of a range of red wavelengths. Further, the red light source device 120 includes a heat sink 125 which is disposed on a side of the red light source 121 which faces the red panel 14. A cooling fan 261 is disposed between the heat sink 125 and the front panel 12, whereby the red light source 121 is cooled by this cooling fan 261.

The blue light source device 130 includes the blue light source 131 which is disposed so that an optical axis thereof becomes parallel to the axis of light emitted from the luminous light emitting device 100 and a group of collective lenses 133 which collects light emitted from the blue light source 131. In addition, the blue light source device 130 is disposed so that an optical axis thereof intersects the axis of light emitted from the red light source device 120. The blue light source 131 is the blue light emitting diode as a semiconductor light emitting element which emits light of a range of blue wavelengths. Further, the blue light source device 130 includes a heat sink 135 which is disposed on a side of the blue light source 131 which faces the front panel 12. A cooling fan 261 is disposed between the heat sink 135 and the front panel 12, whereby the blue light source 131 is cooled by this cooling fan 261.

The light guiding optical system 140 includes the collective lenses which collect pencils of light of red, green and blue wavelength ranges and the dichroic mirrors which change the axes of pencils of red, green and blue light so that the axes are directed in the same direction. Specifically, a first dichroic mirror 141 is disposed in a position where the axes of light of the range of blue wavelengths emitted from the excitation light shining device 70 and light of the range of green wavelengths emitted from the luminescent wheel 101 and the axis of light of the range of red wavelengths emitted from the red light source 120 intersect one another. This first dichroic mirror 141 transmits light of the range of blue wavelengths and light of the range of red wavelengths and reflects light of the range of green wavelengths in such a way that the axis of green light is changed by 90 degrees in the direction of the left panel 15.

A second dichroic mirror 148 is disposed in a position where the axis of light of the range of blue wavelengths emitted from the blue light source device 130 and the axis of light of the range of red wavelengths emitted from the red light source device 120 intersect each other. This second dichroic mirror 148 transmits light of the range of blue wavelengths and reflects light of the range of green wavelengths and light of the range of red wavelengths in such a way that the axes of green light and red light are changed by 90 degrees in the direction of the back panel 13. A collective lens is disposed between the first dichroic mirror 141 and the second dichroic mirror 148.

The light-source-side optical system 170 has the light tunnel 175 which converts a pencil of light emitted from the light source unit 60 into a pencil of light whose intensity is uniformly distributed, a collective lens 173 which collects light source light to an incident plane of the light tunnel 175, a collective lens 178 which collects light emanating from the light tunnel 175, a light axis changing mirror 181 which changes the axis of a pencil of light emanating from the light tunnel 175 in the direction of the left panel 15, a collective lens 183 which collects the light source light reflected by the light axis changing mirror 181 to the display element 51, and a light shining mirror 185 which shines the pencil of light which passes through the collective lens 183 on to the display element 51 at a predetermined angle.

Consequently, the light source light is shone on to the DMD which is the display element 51 by the light shining mirror 185 of the light-source-side optical system 170. Then, the display element 51 is controlled to be driven by the display driving module 26 so as to allow "on" light to be incident on the projection-side optical system 220.

Additionally, a collective lens 195 which makes up apart of the projection-side optical system 220 is disposed near the front of the display element 51. A heat sink 190 is disposed between the display element 51 and the back panel 13 so as to cool the display element 51, whereby the display element 51 is cooled by this heat sink 190.

The projector 10 has a group of lenses of the projection-side optical system 220 which projects "on" light reflected by the display element 51 on to a screen along the left panel 15. A variable-focus lens is provided as part of the projection-side optical system 220, and the variable-focus lens includes a group of fixed lenses 225 which is incorporated in a fixed lens barrel and a group of movable lenses 235 which is incorporated in a movable lens barrel, thus a zooming function being given to the variable-focus lens. The group of movable lenses 235 is moved by a lens motor for zooming and focusing.

Consequently, the turning on and off of the excitation light shining device 70, the red light source device 120 and the blue light source device 130 are individually controlled in a time-sharing fashion by the light source control unit so as to execute a blinking operation so that combined light or monochromatic light can be emitted from the light source unit 60. In addition, the DMD which is the display element 51 of the projector 10 displays red, green and blue light in a time-sharing fashion according to data, thereby making it possible to produce a highly bright color image on the screen.

In the light source unit according to this embodiment, light of the range of green wavelengths from the luminescent material layer 102 is emitted from the luminous light emitting device 100 of the green light source device via the diffuse transmission portion 104 made up of the semi-annular diffuse plate. Therefore, the luminous light from the luminescent material layer 102 can be emitted from the green light source device as a pencil of luminous light having high in-plane uniformity. As a result of this, the light source unit 60, which is the light source device, can emit pencils of light of the ranges of red, green and blue wavelengths to be shone on to the display element 51, whereby the projector 10 can form a projection image with uniform colors or free from uneven colors.

Further, the unevenness of colors in the projection image formed by the luminous light can be reduced in a more ensured fashion by moving the diffuse transmission portion 104.

In addition, the diffuse transmission portion 104 is formed on the luminescent wheel, and the luminescent wheel is rotated by the rotational motor. Therefore, the light source unit can be made small in size and light in weight, and the movement of the diffuse transmission portion 104 can be controlled continuously.

Additionally, the luminescent material layer 102 including the luminescent material and the diffuse plate which is configured as the diffuse transmission portion 104 are formed side by side in an end-to-end fashion along the circumferential edge of the luminescent wheel. Therefore, the necessity is obviated of preparing a separate diffuse plate as a diffuse transmission portion on which luminous light is incident, and this makes it easier for the luminous light emitting device 100 to be made in small in size and light in weight.

The rotational shaft 115 of the luminescent wheel is made parallel to the axis of excitation light, so that excitation light passes through the diffuse transmission portion 104. Therefore, the in-plane uniformity of not only luminous light emitted from the luminescent material but also excitation light shone on to the luminescent material can be enhanced, thereby making it possible to enhance further the in-plane uniformity of luminous light emitted from the light source unit.

Additionally, the light guiding optical system is formed of the mirrors and collective lenses, and therefore, the effective incidence of luminous light emitted from the luminescent material layer 102 of the luminescent wheel 101 on the diffuse transmission portion 104 of the luminescent wheel 101 can be facilitated.

Further, the excitation light sources are formed by the laser emitting devices, and therefore, the light source unit can easily be made into a high-intensity light source unit which can emit highly bright light.

It is noted that the light guiding optical system does not have to use the mirrors and can use a reflection prism in place of the mirrors and the intermediate collective lens.

In addition, the invention is not limited to the configuration in which the luminescent material layer 102 including the luminescent material is formed on the front panel side of the luminescent wheel 101 which is disposed substantially parallel to the front panel 12. Hence, a configuration may be adopted in which the light guiding system is omitted, a luminous light emitting area is formed into an annular shape extending along the full circumference of the luminescent wheel 101 on a back panel side of the luminescent wheel 101, that is, the side of the luminescent wheel 101 which faces the excitation light shining device 70, and a diffuse plate is provided parallel to the luminescent wheel 101 and closer to the back panel than the luminescent wheel 101.

In addition, a configuration may be adopted in which this diffuse plate is also formed into a circular disk shape and is rotated by a motor as a driving device.

In addition, the invention is not limited to the embodiment and modifications that have been described heretofore, and hence, the invention can be modified variously in stages where the invention is carried out without departing from the spirit and scope of the invention. Additionally, in carrying out the invention, the functions executed in the embodiment and modifications may be combined as required as much as possible. The embodiment includes various stages, and various inventions can be extracted by appropriate combinations of the constituent elements disclosed. For example, as long as an advantage can be obtained even though some of all the constituent elements disclosed in the embodiment are deleted, the configuration in which some such constituent elements are deleted can be extracted as an invention.

What is claimed is:

1. A light source unit comprising:
    an excitation light source which emits excitation light;
    a rotational member on which a diffuse plate and a luminescent material layer are provided side by side, the excitation light passing through the diffuse plate, and the luminescent material layer receiving the excitation light which has passed through the diffuse plate so as to emit luminous light;
    a light guiding optical system through which the luminous light emitted from the luminescent material layer enters the diffuse plate; and
    a driving device which drives the rotational member to be rotated so as to change an entering position of the luminous light on the diffuse plate.

2. The light source unit according to claim 1, wherein the light guiding system has a mirror and a collective lens.

3. The light source unit according to claim 1, wherein the excitation light source comprises a laser emitting device.

4. A projector comprising:
the light source unit according to claim 1;
a display element;
a light-source-side optical system which guides light from the light source unit to the display element, wherein the display element forms an optical image by using the light shone thereon;
a projection-side optical system which projects the optical image formed by the display element onto a screen; and
a projector control unit which has a light source control module for the light source unit and a display element control module.

5. A light source unit illumination method comprising:
shining excitation light from an excitation light source onto a luminescent material layer which is provided on a rotational member;
causing luminous light emitted from the luminescent material layer to enter a diffuse plate through a light guiding optical system, the diffuse plate being provided on the rotational member;
diffusing the luminous light on the diffuse plate while changing an entering position of the luminous light which enters the diffuse plate by rotating the rotational member; and
thereafter, collecting the luminous light diffused on the diffuse plate for emission from a light source unit.

* * * * *